United States Patent Office 3,196,129
Patented July 20, 1965

3,196,129
VINYL POLYMERS STABILIZED WITH THIO-
ACETAL AND THIOKETAL TIN COMPOUNDS
Ingenuin Hechenbleikner, Kenwood, Robert E. Bresser,
Sharonville, and Otto A. Homberg, Woodlawn, Ohio,
assignors to Carlisle Chemical Works, Inc., Reading,
Ohio, a corporation of Ohio
No Drawing. Filed May 1, 1962, Ser. No. 191,463
18 Claims. (Cl. 260—45.75)

This application is a continuation-in-part of application Serial No. 103,256, filed April 17, 1961, now Patent 3,078,290, issued February 19, 1963.

The present invention relates to novel thioacetals and thioketals and their use as stabilizers for solid polymers of monoolefins having 2 to 4 carbon atoms and as stabilizers for solid polymers of monoolefins having 2 to 4 carbon atoms and as stabilizers for halogen-containing resins.

It is an object of the present invention to prepare novel thioacetals and thioketals.

Another object is to prepare novel mono-, di- or trihydrocarbon tin salts of acids having a thioketal or thioacetal group.

An additional object is to prepare novel stabilized compositions containing solid polymers of monoolefins having 2 to 4 carbon atoms, preferably polypropylene.

Another object is to stabilize polypropylene and other polymers of monoolefins having 2 to 4 carbon atoms with synergistic stabilizer compositions.

A further object is to extend the heat and light stability of halogen-containing resins.

An additional object is to provide novel stabilized vinyl resin compositions.

Yet another object is to provide novel synergistic stabilizers for halogen-containing resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In one form of the invention there are prepared dihydrocarbon tin salts of acids having a thioacetal or thioketal grouping. Such compounds belong to one of the following groups (I) 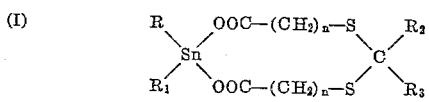

or (Ia) 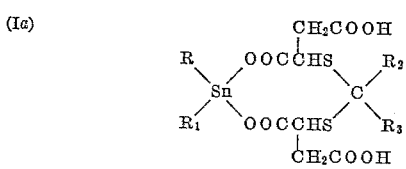

where $n$ is an integer from 1 to 8, R and $R_1$ are alkyl, aralkyl or aryl and $R_2$ and $R_3$ are hydrogen, alkyl, alkenyl, aralkyl, aryl, hydroxyaryl, alkoxyaryl or taken together complete a cyclohexane ring, i.e., the pentamethylene radical.

(II) 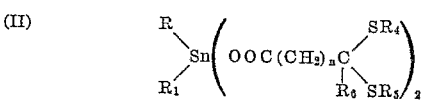

where $n$, R and $R_1$ are as defined above, $R_4$ and $R_5$ are alkyl, aralkyl, aryl, carboxylic acid or carboxylic acid ester and $R_6$ is hydrogen, alkyl, benzyl or aryl.

(III) 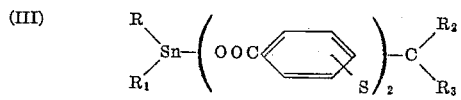

where R, $R_1$, $R_2$ and $R_3$ are as defined above (IV) 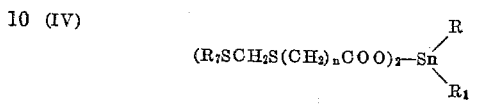

where $n$, R and $R_1$ are as defined above and $R_7$ is alkyl, aralkyl or aryl.

(V) 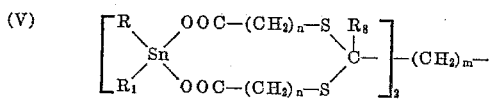

where R, $R_1$, and $n$ are defined as above, $R_8$ is alkyl, aralkyl or aryl and $m$ is an integer from 0 to 8.

Another aspect of the invention is the preparation of monohydrocarbon and trihydrocarbon tin salts of acids having a thioacetal or thioketal grouping. Such compounds belong to one of the following groups:

(A) 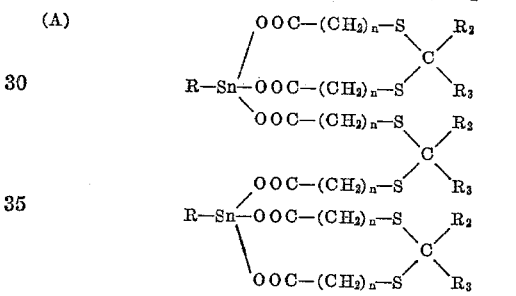

where $n$, R, $R_2$ and $R_3$ are as defined above.

(B) 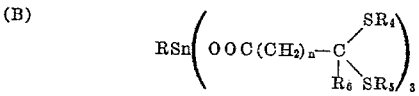

where $n$, R, $R_4$, $R_5$ and $R_6$ are as defined above.

(C) 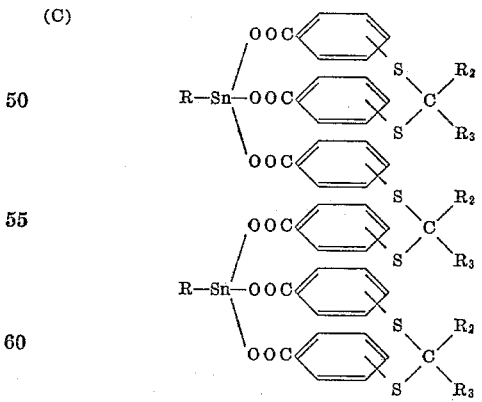

where R, $R_2$ and $R_3$ are as defined above.

(D) 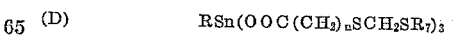

where $n$, R, and $R_7$ are as defined above.

(E) 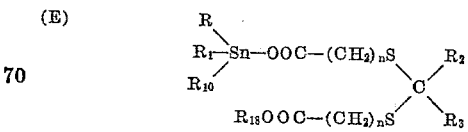

where $n$, R, $R_1$, $R_2$ and $R_3$ are as defined above; $R_{10}$ is alkyl, aralkyl or aryl and $R_{18}$ is H or

Preferably, $R_{18}$ is

(F) 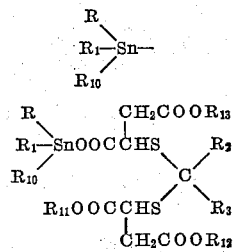

where R, $R_1$, $R_2$, $R_3$ and $R_{10}$ are as defined above and $R_{11}$, $R_{12}$ and $R_{13}$ are selected from the group consisting of hydrogen and

(G) 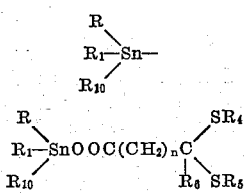

where $n$, R, $R_1$, $R_4$, $R_5$, $R_6$ and $R_{10}$ are as defined above.

(H) 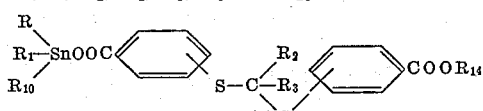

where R, $R_1$, $R_2$, $R_3$ and $R_{10}$ are as defined above, and $R_{14}$ is selected from the group consisting of hydrogen and

(J) 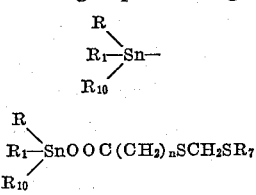

where $n$, R, $R_1$, $R_7$ and $R_{10}$ are as defined above.

(K) 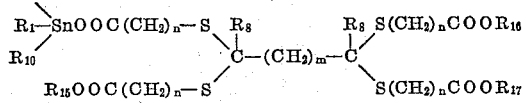

where $m$, $n$, R, $R_1$, $R_8$ and $R_{10}$ are as defined above, and $R_{15}$, $R_{16}$ and $R_{17}$ are selected from the group consisting of hydrogen and

While the formulae are written for the monomeric materials, many of them also exist in a polymeric form closely approximating the monomeric formulae.

In another form of the invention certain thioacetals and thioketals are mixed with dihydrocarbon tin oxides or sulfides or with monohydrocarbon stannoic acids or monohydrocarbon tin alcoholates or trihydrocarbon tin oxides.

The thioacetals and thioketals have the following formulae:

(VI) 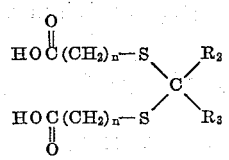

or (VIa) 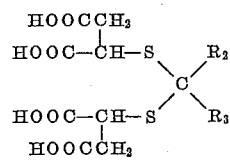

(VII) 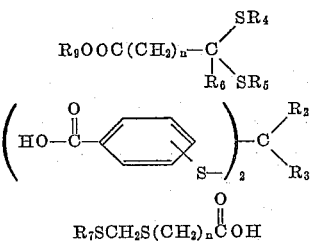

(VIII) 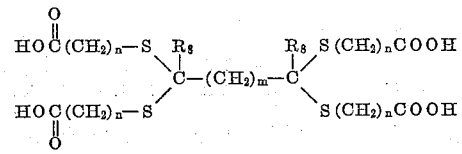

(IX) $R_7SCH_2S(CH_2)_n\overset{O}{\underset{\|}{C}}OH$ (X) 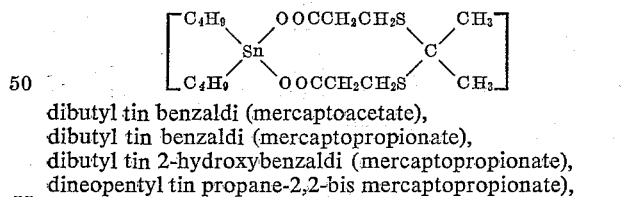

In Formulae VI through X the definitions of $m$, $n$, $R_2$, $R_3$, $R_4$, $R_5$, $R_6$, $R_7$ and $R_8$ are the same as those defined above and $R_9$ is hydrogen or alkyl.

As the dihydrocarbon tin oxide or sulfide, there can be used dimethyl tin oxide, dibutyl tin oxide, dioctyl tin oxide, dilauryl tin oxide, butyl lauryl tin oxide, dioctadecyl tin oxide, diphenyl tin oxide, dimethyl tin sulfide, dibutyl tin sulfide, dioctyl tin sulfide, dilauryl tin sulfide, diphenyl tin sulfide, dioctadecyl tin sulfide, dicyclohexyl tin oxide, etc.

As monohydrocarbon stannoic acids and monohydrocarbon tin alcoholates there can be used methyl stannoic acid, butyl stannoic acid, lauryl stannoic acid, octadecyl stannoic acid, phenyl stannoic acid, butyl tin triisopropylate, octyl tin triisopropylate, octadecyl tin trimethylate, butyl tin tributylate.

As trihydrocarbon tin oxides there can be used tributyl tin oxide $[(C_4H_9)_3Sn]_2O$, trioctyl tin oxide, trioctadecyl tin oxide, triphenyl tin oxide, dibutyl octyl tin oxide, and trilauryl tin oxide.

Typical examples of compounds in Group I are dibutyl tin propane-2,2-bis (mercaptopropionate)

$$\begin{bmatrix} C_4H_9 & OOCCH_2CH_2S & CH_3 \\ & Sn & C \\ C_4H_9 & OOCCH_2CH_2S & CH_3 \end{bmatrix}$$

dibutyl tin benzaldi (mercaptoacetate),
dibutyl tin benzaldi (mercaptopropionate),
dibutyl tin 2-hydroxybenzaldi (mercaptopropionate),
dineopentyl tin propane-2,2-bis mercaptopropionate),
dibutyl tin isodecane 1,1-bis mercaptopropionate),
dioctyl tin propane 2,2-bis (mercaptopropionate),
dibutyl tin cyclohexyl 1,1-bis (mercaptopropionate),
dimethyl tin propane 1,2-bis (omega mercaptooctanoate),
dioctadecyl tin methane bis (mercaptoacetate),
diphenyl tin propane 2,2-bis (mercaptopropionate),
dibutyl tin propene 3,3-bis (mercaptopropionate),
butyl lauryl tin phenylacetaldi (mercaptoacetate),
dihexyl tin 2-butene-1,1-bis (mercaptopropionate),
dibutyl tin diphenyl methane bis (mercaptopropionate)

$$\begin{bmatrix} C_4H_9 & OOCCH_2CH_2-S & \\ & Sn & C \\ C_4H_9 & OOCCH_2CH_2-S & \end{bmatrix}$$

dibenzyl tin propane-2-mercaptoacetate-2-mercaptopropionate,
dibutyl tin 2-hydroxy-4-methoxybenzaldi (mercaptobutyrate) and
dibutyl tin propane 2,2-bis (mercaptosuccinate).

Typical examples of compounds in Group II are dibutyl tin di [4,4-bis (dodecylthio) valerate]

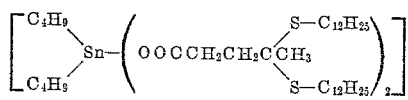

dibutyl tin di [4,4-bis (phenylthio) valerate],
dioctadecyl tin di [4,4-bis (phenylthio) valerate],
dioctyl tin di [4,4-bis (carboxyethylthio) valerate],
butyl octyl tin di [4,4-bis (carbobutoxyethylthio) valerate],
dimethyl tin di [4,4-bis (dodecylthio) valerate],
dioctyl tin di [ethyl 3,3-bis (carboxyethylthio) butyrate]

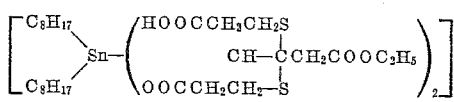

diphenyl tin di [3,3-bis (benzylthio)-3-phenyl propionate].

Typical examples of compounds in Group III are dibutyl tin 2-hydroxybenzaldi (2'-mercaptobenzoate),
dibutyl tin propane-2,2-bis (2'-mercaptobenzoate)

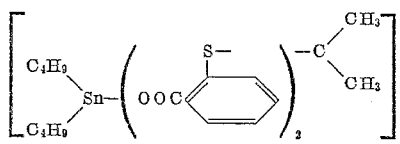

diphenyl tin methane-bis (4-mercaptobenzoate), dilauryl tin diphenyl methane-bis (3-mercaptobenzoate), dimethyl tin ethane-1,1-bis (2'-mercaptobenzoate).

Typical examples of compounds in Group IV are dibutyl tin di (dodecylthiomethyl thioacetate) [$(C_4H_9)_2$ Sn $(OOCCH_2SCH_2SC_{12}H_{25})_2$], dilauryl tin di (methylthiomethyl-thiopropionate), dimethyl tin di (phenylthiomethyl-thiooctanoate), diphenyl tin di (benzylthiomethyl-thioacetate).

Typical examples of compounds in Group V are di (dibutyl tin) ethane 1,1,2,2-tetrakis (mercaptopropionate)

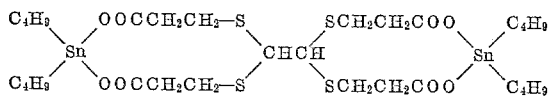

di (dioctyl tin)-1-methyl ethane 1,1,2,2-tetrakis (mercaptoacetate), di (diphenyl tin) butane-1,1,4,4-tetrakis (mercaptopropionate), di (dilauryl tin) hexane-1,1,6,6-tetrakis (mercaptooctanoate).

Typical examples of compounds in Group A are bis (butyl tin) tri (propane-2,2-bis-β-mercaptopropionate); bis (butyl tin) tri (benzaldi-β-mercaptopropionate); bis (octyl tin) tri (propane-2,2-bis mercaptoacetate); bis (phenyl tin) tri (hydroxybenzaldi-β-mercaptopropionate); bis (methyl tin) tri (cyclohexyl-1,1-bis mercaptooctanoate); bis (benzyl tin) tri (2-hydroxy-4-methoxybenzaldi mercaptobutyrate); bis (octadecyl tin) tri (2-butene-1,1-bis mercaptopropionate).

Typical examples of compounds in Group B are butyl tin tri [4,4-bis (dodecylthio) valerate], butyl tin tri [4,4-bis (phenylthio) valerate], octadecyl tin tri [4,4-bis (phenylthio) valerate], octyl tin tri [4,4-bis carboxyethylthio) valerate], butyl tin tri [4,4-bis (carbobutoxyethylthio) valerate], methyl tin tri [ethyl-3,3-bis (carboxyethylthio) butyrate], phenyl tin tri [3,3-bis (benzylthio)-3-phenylpropionate].

Typical examples of compounds in Group C are bis (butyl tin) tri (benzaldi 2'-mercaptobenzoate), bis (butyl tin) tri propane-2,2-bis-2'-mercaptobenzoate, bis (phenyl tin) tri (2-hydroxybenzaldi 2'-mercaptobenzoate), bis (octyl tin) tri (methane-bis-4-mercaptobenzoate), bis (lauryl tin) tri (diphenylmethane bis (3-mercaptobenzoate), bis (methyl tin) tri (ethane-1,1-bis-2'-mercaptobenzoate).

Typical examples of compounds in Group D are butyl tin tri (dodecylthiomethyl thioacetate), lauryl tin tri (methylthiomethyl thiopropionate), methyl tin tri (phenylthiomethyl thiooctanoate), phenyl tin tri (benzylthiomethyl thioacetate).

Typical examples of compounds in Group E are bis (tributyl tin) propane-2,2-bis-β-mercaptopropionate, bis (tributyl tin) benzaldi-β-mercaptopropionate, bis (butyl octyl octadecyl tin) propane-2,2-bis mercaptoacetate, bis (trioctyl tin) propane-2,2-bis-mercaptooctanoate, bis (triphenyl tin) hydroxybenzaldi-β-mercaptopropionate, bis (trimethyl tin cyclohexyl-1,1-bis mercaptoacetate, bis (tribenzyl tin)-2-hydroxy-4-methoxybenzaldi mercaptobutyrate, bis (tri octadecyl tin) 2-butene-1,1-bis mercaptopropionate, tributyl tin propane-2,2-bis-β-mercaptopropionate, trioctyl tin benzaldi-mercaptoacetate

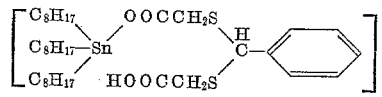

Typical examples of compounds in Group F are tributyl tin propane 2,2-bis mercaptosuccinate

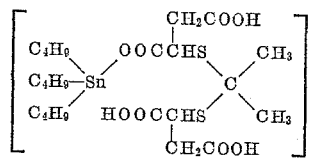

bis (tributyl tin) propane 2,2-bis mercaptosuccinate, tris (triphenyl tin) propane 2,2-bis mercaptosuccinate, tetra (trioctyl tin) propane 2,2-bis mercaptosuccinate.

Typical examples of compounds in Group G are tributyl tin 4,4-bis (dodecythio) valerate, tributyl tin 4,4-bis (phenylthio) valerate, trioctadecyl tin 4,4-bis (phenylthio) valerate, trioctyl tin 4,4-bis (carboxyethylthio) valerate, butyloctyl lauryl tin 4,4-bis (carbobutylethylthio) valerate, trimethyl tin 4,4-bis (dodecylthio) valerate, trioctyl tin ethyl-3,3-bis (carboxyethylthio) butyrate, triphenyl tin 3,3-bis (benzylthio)-3-phenyl propionate.

Typical examples of compounds in Group H are bis (tributyl tin) propane-2,2-bis (2'-mercaptobenzoate), bis (tributyl tin)-2-hydroxybenzaldi (2'-mercaptobenzoate), bis (triphenyl tin) benzaldi (2'-mercaptobenzoate), bis (trioctyl tin) methane-bis (4-mercaptobenzoate), bis (trilauryl tin) diphenyl methane bis (3-mercaptobenzoate), bis (trimethyl tin) ethane-1,1-bis (2'-mercaptobenzoate), tributyl tin propane-2,2-bis (2'-mercaptobenzoate)

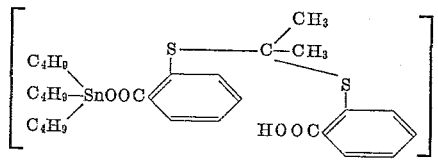

Typical examples of compounds in Group J are tributyl tin dodecylthiomethyl thioacetate, trilauryl tin methylthiomethyl thiopropionate, trimethyl tin phenylthiomethyl thiooctanoate, triphenyl tin benzylthiomethyl thioacetate.

Typical examples of compounds in Group K are trioctyl tin -1-methyl ethane 1,1,2,2-tetrakis (mercaptoacetate), tributyl tin ethane 1,1,2,2-tetrakis (mercaptopropionate), bis (tributyl tin) ethane 1,1,2,2-tetrakis (mercaptopropionate), tris (tributyl tin) ethane 1,1,2,2-tetrakis (mercaptopropionate), tetra (tributyl tin) ethane 1,1,2,2-tetrakis (mercaptopropionate), tetra (triphenyl tin) butane 1,1,4,4-tetrakis (mercaptopropionate), tetra (trilauryl tin) hexane-1,1,6,6-tetrakis (mercaptooctanoate).

Typical examples of compounds in Groups VI and VIa are benzaldi (mercaptoacetic acid), benzaldi (mercaptopropionic acid), 2-hydroxybenzaldi (mercaptoacetic acid), 2-hydroxybenzaldi (mercaptopropionic acid), 4-hydroxy-3-methoxy-benzaldi (mercaptopropionic acid), cyclohexyl-1,1-bis (mercaptoacetic acid), cyclohexyl-1,1-bis (mercaptopropionic acid), methane-bis-(mercaptoacetic acid), methane-bis (mercaptopropionic acid), isodecane-1,1-bis (mercaptoacetic acid, isodecane-1, 1-bis (mercaptopropionic acid), propane-2, 2-bis (mercaptoacetic acid), propane-2,2-bis (mercaptopropionic acid), 4-methylpentane-2,2-bis (mercaptoacetic acid), butane-2,2-bis (mercaptoacetic acid), diphenylmethane-bis (mercaptopropionic acid), propene-3,3-bis (mercaptopropionic acid), 2-butene-1,1-bis (mercaptopropionic acid), propane-2,2-bis (mercaptosuccinic acid), 2-hydroxybenzaldi (2'-mercaptobenzoic acid), propane-2,2-bis (mercaptooctanoic acid), phenylacetaldi (mercaptoacetic acid), propane-2-mercaptoacetic acid-2-mercaptopropionic acid, and 2 - hydroxy - 4 - methoxybenzaldi (mercaptobutyric acid).

Typical examples of compounds in Group VII are 4,4-bis (carbobutoxyethylthio) valeric acid, 4,4-bis (dodecylthio) valeric acid, 4,4-bis (phenylthio) valeric acid, 4,4-bis (carboxyethylthio) valeric acid, ethyl-3,3-bis (carboxyethylthio) butyrate

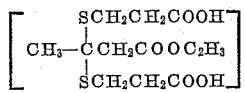

3,3-bis (benzylthio)-3-phenylpropionic acid.

Typical examples of compounds in Group VIII are 2-hydroxybenzaldi (2'-mercaptobenzoic acid), propane-2,2 - bis (2'-mercaptobenzoic acid), methane-bis (4-mercaptobenzoic acid), methane-bis (3-mercaptobenzoic acid), ethane-1,1-bis (2'-mercaptobenzoic acid), phenylmethane bis (2-mercaptobenzoic acid).

Typical examples of compounds in Group IX are dodecylthiomethyl mercaptoacetic acid, methylthiomethyl mercaptopropionic acid, phenylthiomethyl mercaptooctanoic acid, benzylthiomethyl mercaptoacetic acid, butylthiomethyl mercaptopropionic acid.

Typical examples of compounds in Group X are ethane-1,1,2,2-tetrakis (mercaptopropionic acid), 1-methylethane 1,1,2,2 - tetrakis (mercaptoacetic acid), pentane - 2,2,4,4-tetrakis (mercaptopropionic acid), ethane-1,1,2,2-tetrakis (mercaptoacetic acid), 1,1,4,4-tetrakis butane-(mercaptopropionic acid), hexane 1,1,6,6-tetrakis (mercaptooctanoic acid).

Example I

Butyl stannoic acid (0.91 mole) was heated in a vacuum (water pump) with 1.37 moles of propane-2,2-bis-β-mercaptopropionic acid and the water removed. The product was bis (butyl tin) tri (propane-2,2-bis-β-mercaptopropionate), a white solid melting or softening around 50–80° C., tin 21.5% (theory 21.6%), sulfur 17.68% (theory 17.4%). The solid appeared to be in polymeric form.

Example II

One mol of butyl tin triisopropylate was heated with 1.5 moles of propane 2,2-bis-β-mercaptopropionic acid in 200 ml. of isopropyl alcohol and there was recovered as the residue bis (butyl tin) tri (propane-2,2-bis-β-mercaptopropionate) having the same properties as the product of Example I.

Example III 0.0865 mol of butyl stannoic acid was heated with 0.13 mol of benzaldi-β-mercaptopropionic acid in a vacuum and the water removed to recover bis (butyl tin) tri (benzaldi-bis-β-mercaptopropionate) as a pale yellow solid melting at 67–88° C., tin 19.5% (theory 19.05%), sulfur 15.82% (theory 15.42%). The solid appeared to be in polymeric form.

Example IV 0.15 mol of tributyl tin oxide was reacted with 0.15 mol of propane-2,2-bis-β-mercaptopropionic acid in 100 ml. of a mixture of equal amounts by volume of hexane and benzene. The bis (tributyl tin) propane-2,2-bis-β-mercaptopropionate obtained was recrystallized from isopropanol as a white crystalline solid, M.P. 98–99° C., tin 28.0% (theory 28.6%), sulfur 7.52% (theory 7.73%).

Example V 0.15 mol of tributyl tin oxide was heated to reflux with 0.15 mol of benzaldi-β-mercaptopropionic acid in 100 ml. of a mixture of equal amounts by volume of hexane and benzene. The bis (tributyl tin) benzaldi-β-mercaptopropionate obtained was a white crystalline solid, M.P. 95–96° C., tin 26.9% (theory 27.0%), sulfur 7.38% (theory 7.30%).

Example VI

One mol of octyl stannoic acid and one mol of 4,4-bis (carboxyethylthio) valeric acid were heated in a vacuum and the water removed to recover octyltin tri [4,4-bis (carboxyethylthio) valerate].

Example VII

One mol of butyl stannoic acid was heated in a vacuum with 1.5 moles of benzaldi 2'-mercaptobenzoic acid and the water removed to recover bis (butyl tin) tri (benzaldi 2'-mercaptobenzoate).

Example VIII

One mol of butyl stannoic acid and one mol of dodecylthiomethylthioacetic acid were heated in a vacuum and the water removed to recover butyl tin tri (dodecylthiomethylthioacetate).

Example IX

One mol of tributyl tin oxide was heated to reflux with 2 moles of propane-2,2-bis (mercaptosuccinic acid) in 500 ml. of a mixture of equal amounts by volume of benzene and hexane to obtain tetra (tributyl tin) propane 2,2-bis mercaptosuccinate as the product.

When there was used only 0.5 mol of propane-2,2-bis (mercaptosuccinic acid) in this reaction the product obtained was tetra (butyl tin) propane-2,2-bis mercaptosuccinate.

Example X

One mol of trioctyl tin oxide was heated to reflux with 2 moles of 1 - methyl ethane-1,1,2,2-tetrakis (mercaptoacetic acid) in 750 ml. of a mixture of equal parts by volume of benzene and hexane to obtain trioctyl tin-1-methylethane 1,1,2,2-tetrakis (mercaptoacetate) as the product.

Example XI

One mol of tributyl tin oxide was heated to reflux with 0.5 mol of ethane-1,1,2,2,-tetrakis (mercaptopropionic acid) in 500 ml. of a mixture of equal parts by volume of benzene and hexane to obtain tetra (tributyl tin) ethane 1,1,2,2-tetrakis (mercaptopropionate) as the product.

Example XII

One mol of tributyl tin oxide was heated to reflux with 2 moles of 4,4-bis (dodecylthio) valeric acid in 750 ml. of a mixture of equal parts by volume of benzene and hexane to obtain tributyl tin 4,4-bis (dodecylthio) valerate as the product.

Example XIII

The procedure of Example XII was repeated replacing the 4,4-bis (dodecylthio) valeric acid by 2 moles of dodecylthiomethylthioacetic acid to produce tributyl tin dodecylthiomethylthioacetate as the product.

Example XIV

One mol of tributyl tin oxide was heated to reflux with one mol of propane-2,2-bis (2'-mercaptobenzoic acid) in 500 ml. of a mixture of equal parts by volume of benzene and hexane to obtain bis (tributyl tin) propane-2,2,-bis (2'-mercaptobenzoate) as the final product.

The stabilizers of the present invention can be used with halogen containing vinyl and vinylidene resins in which the halogen is attached directly to a carbon atom in the polymer chain. Preferably, the resin is a vinyl halide resin, specifically, a vinyl chloride resin. Usually, the vinyl chloride resin is made from monomers consisting of vinyl chloride alone or a mixture of monomers comprising at least 70% vinyl chloride by weight. When vinyl chloride copolymers are stabilized, preferably the copolymer of vinyl chloride with an ethylenically unsaturated compound copolymerizable therewith contains at least 10% of polymerized vinyl chloride.

As the chlorinated resin there can be employed chlorinated polyethylene having 14 to 75%, e.g., 27% chlorine by weight, polyvinyl chloride, polyvinylidene chloride, polyvinyl bromide, polyvinyl fluoride, copolymers of vinyl chloride with 1 to 90%, preferably 1 to 30%, of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichloroethylene, vinyl ethers such as vinyl ethyl ether, vinyl chloroethyl ether and vinyl phenyy ether, vinyl ketones such as vinyl methyl ketone and vinyl phenyl ketone, 1-fluoro-1-chloroethylene, acrylonitrile, chloracrylonitrile, allylidene diacetate and chloroallylidene diacetate. Typical copolymers include vinyl chloride-vinyl acetate (96:4 sold commercial as VYNW), vinyl chloride-vinylacetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride-2- ethylhexyl acrylate (80:20).

The stabilizers of the present invention can be incorporated with the resin by admixing in an appropriate mill or mixer or by any of the other well-known methods which provide for uniform distribution throughout the resin compositions. Thus, mixing can be accomplished by milling on rolls at 100–160° C.

In addition to the novel stabilizers there can also be incorporated with the resin conventional additives such as plasticizers, pigments, fillers, dyes, ultraviolet light absorbing agents, densifying agents and the like.

If a plasticizer is employed, it is used in conventional amount, e.g., 30 to 150 parts per 100 parts of resin. Typical plasticizers are di-2-ethylhexyl phthalate, dibutyl sebacate, dioctyl sebacate, tricresyl phosphate.

The tin containing stabilizers in Groups I, Ia, II, III, IV, V, A, B, C, D, E, F, G, H, J and K are normally used in an amount of 0.01 to 10% by weight of the chlorinated resin. More preferably, 0.2 to 5% of the tin compound is used by weight of the resin.

When a mixture of dihydrocarbon tin oxide or sulfide or trihydrocarbon tin oxide or monohydrocarbon stannoic acid is employed with the thioacetals or ketals of Groups VI, VIa, VII, VIII, IX and X, there is normally used 0.01 to 10% of the tin compound by weight of the resin and the thioacetal or thioketal is also normally used in an amount of 0.01 to 10% by weight of the resin. More preferably, 0.2 to 5% of the tin compound and 0.2 to 5% of the thioacetals or thioketal is employed based on the weight of the resin.

The following examples employ the stabilizers of the present invention with vinyl chloride resins. Without exception there was greater stabilization than when the equivalent amount of dibutyl tin dilaurate was employed. Many of the compounds and compositions were superior to dibutyl tin bis (isooctylthioglycolate) as stabilizers for vinyl chloride resins.

The following examples (except comparison Examples 1 and 2) illustrate the stabilizing effect of the additives of the present invention. It should be noted that the first yellowing does not necessarily limit the usefulness of the stabilizer. The stabilizer tests were carried out at 360° F. (182° C.) in the conventional forced draft oven. In the tables 101 EP and 103 EP designate Geon 101 EP and Geon 103 EP which are vinyl chloride homopolymers manufactured by B. F. Goodrich. VYNW designates a 96:4 vinyl chloride-vinyl acetate copolymer and St. Gobain, a commercially available vinyl chloride resin. In the tests all parts are expressed as parts per 100 parts by weight of the resin. The letter Y designates the time in minutes at which color first appeared. The letter B designates the time in minutes at which the resin became very dark.

Example 1

[Dibutyl tin dilaurate—Molecular weight 528]

| Parts stabilizer | 0.95 | 0.94 | 1.88 | 2.82 |
|---|---|---|---|---|
| Resin | 103EP | 101EP | 103EP | 103EP |
| Dioctyl phthalate (parts) | 0 | 50 | 50 | 0 |
| Results | Y-0 | Y-15 | Y-30 | Y-0 |
|  | B-60 | B-45 | B-75 | B-75 |

Example 2

[Dibutyl tin (isooctylthioglycolate)—Molecular weight 580]

| Parts stabilizer | 0.94 | 0.775 | 0.95 | 1.0 | 1.67 | 1.11 |
|---|---|---|---|---|---|---|
| Resin | 103EP | 103EP | 103EP | 101EP | VYNW | St. Gobain |
| Dioctyl phthalate (parts) | 50 | 50 | 0 | 0 | 0 | 50 |
| Results | Y-45 | Y-45 | Y-45 | Y-30 | Y-75 | Y-60 |
|  | B-90 | B-75 | B-60 | B-75 | B-75 | B-75 |

Example 3

[Dibutyl tin isodecane-1,1-bis (mercaptopropionate)—Molecular weight 580]

| Parts stabilizer | 0.86 |
|---|---|
| Resin | 103EP |
| Results | Y-45 |
|  | B-75 |

Example 4

[Dibutyl tin benzaldi (mercaptopropionate)—Molecular weight 530]

| Parts stabilizer | 1.60 |
|---|---|
| Resin | 103EP |
| Dioctyl phthalate (parts) | 50 |
| Results | Y-75 |
|  | B-120 |

Example 5

[Dioctyl tin propane-2,2-bis (mercaptopropionate)—Molecular weight 594]

| Parts stabilizer | 0.875 | 0.453 | 0.453 |
|---|---|---|---|
| Epoxidized soya oil | 0 | 0 | 5 |
| Epoxidized isooctyl oleate | 0.875 | 0.453 | 0.453 |
| Resin | 103EP | 101EP | 101EP |
| Results | Y-75 | Y-75 | Y-75 |
|  | B-105 | B-90 | B-135 |

Example 6

[Dibutyl tin benzaldi (mercaptoacetate)—Molecular weight 502]

| Parts stabilizer | 0.75 | 1.5 | 0.75 | 0.75 | 1.48 | 1.48 |
|---|---|---|---|---|---|---|
| Resin | 103EP | 103EP | 103EP | 103EP | 103EP | 103EP |
| Dioctyl phthalate (parts) | 0 | 0 | 50 | 0 | 50 | 0 |
| Tricresyl phosphate (parts) | 0 | 0 | 0 | 0 | 0 | 50 |
| Results | Y-60 B-75 | Y-60 B-120 | Y-15 B-75 | Y-45 B-75 | Y-30 B-165 | Y-30 B-165 |

Example 7

[Dibutyl tin propane-2,2-bis (mercaptopropionate)—Molecular weight 482]

| Parts stabilizer | 0.715 | 1.07 | 0.72 | 0.715 | 0.905 |
|---|---|---|---|---|---|
| Epoxidized soya oil | 0 | 0 | 5 | 0 | 0 |
| Resin | 103EP | VYNW | 101EP | 101EP | 103EP |
| Dioctyl phthalate | 50 | 0 | 0 | 0 | 0 |
| Results | Y-90 B-105 | Y-75 B-75 | Y-75 B-120 | Y-75 B-90 | Y-75 B-75 |

Example 8

[Compound: Benzaldi bis (mercaptopropionic acid)—Molecular weight 300]

| Dibutyl tin oxide (parts) | 0.74 | 0.74 | 0.74 | 0.74 | 0.74 | 0.74 | 0.37 | 0.37 | 0.37 | 0.37 | 0.37 |
|---|---|---|---|---|---|---|---|---|---|---|---|
| Above compound (parts) | 0.88 | 0.45 | 0.88 | 0.45 | 0.88 | 0.49 | 0.25 | 0.30 | 0.46 | 0.23 | 0.46 |
| Resin | 103EP | 103EP | 103EP | 103EP | 103EP | 103EP | 103EP | 101EP | 101EP | 101EP | 101EP |
| Dioctyl phthalate (parts) | 50 | 50 | 50 | 50 | 0 | 50 | 0 | 0 | 0 | 0 | 50 |
| Tricresyl phosphate (parts) | 0 | 0 | 0 | 0 | 50 | 0 | 0 | 0 | 0 | 0 | 0 |
| Results | Y-75 B-135 | Y-90 B-135 | Y-60 B-165 | Y-120 B-165 | Y-60 B-165 | Y-75 B-155 | Y-15 B-105 | Y-30 B-75 | Y-30 B-75 | Y-60 B-75 | Y-30 B-90 |

Example 9

[Compound: O-hydroxybenzaldi (mercaptopropionic acid)—Molecular weight 316]

| Dibutyl tin oxide | 0.74 | 0.74 | 0.74 | 0.37 | 0.37 | 0.37 | 0.37 | 0.37 | 0.37 | 0.37 | 0.555 | 0.37 | 0.37 |
|---|---|---|---|---|---|---|---|---|---|---|---|---|---|
| Above compound | 0.59 | 0.59 | 0.59 | 0.30 | 0.275 | 0.26 | 0.30 | 0.32 | 0.35 | 0.50 | 0.77 | 0.475 | 0.44 |
| Resin | 103 EP | 103 EP | 103 EP | St. Gobain | 103 EP | 103 EP | St. Gobain | 101 EP | 103 EP | 103 EP | 101 EP | 101 EP | 101 EP |
| Dioctyl phthalate | 50 | 50 | 0 | 50 | 50 | 0 | 0 | 0 | 0 | 0 | 0 | 0 | 50 |
| Tricresyl phosphate | 0 | 0 | 50 | 0 | 0 | 0 | 0 | 0 | 0 | 0 | 0 | 0 | 0 |
| Results | Y-90 B-135 | Y-90 *B-165 | Y-75 B-75 | Y-75 B-120 | Y-90 B-120 | Y-60 B-105 | Y-60 B-75 | Y-15 B-90 | Y-30 B-90 | Y-15 B-120 | Y-30 B-90 | Y-30 B-90 | Y-75 B-105 |

*Indicates resin was not very dark when test was terminated after 165 minutes.

Example 10

[Compound: Isodecane-1,1-bis(mercaptoacetic acid)—Molecular weight 322]

| Dibutyl tin oxide | 0.37 |
|---|---|
| Above compound | 0.50 |
| Resin | 101EP |
| Results | Y-0 B-90 |

Example 11

[Compound: Propane-2,2-bis (mercaptoacetic acid)—Molecular weight 224]

| Dibutyl tin oxide | 0.37 | 0.37 | 0.37 | 0.37 | 0.37 |
|---|---|---|---|---|---|
| Above compound | 0.21 | 0.22 | 0.36 | 0.20 | 0.21 |
| Resin | 103EP | St. Gobain | 101EP | 101EP | 103EP |
| Results | Y-30 B-105 | Y-15 B-90 | Y-30 B-60 | Y-15 B-60 | Y-30 B-60 |

Example 12

[Compound: Diphenylmethane-bis (mercaptopropionic acid)—Molecular weight 348]

| Dibutyl tin oxide | 0.37 | 0.37 | 0.37 | 0.37 | 0.37 |
|---|---|---|---|---|---|
| Above compound | 0.31 | 0.35 | 0.35 | 0.57 | 0.57 |
| Resin | 103EP | 101EP | 103EP | 101EP | 101EP |
| Dioctyl phthalate | 0 | 0 | 0 | 0 | 50 |
| Results | Y-30 B-90 | Y-45 B-75 | Y-30 B-75 | Y-30 B-75 | Y-30 B-45 |

Example 13

[Compound: Methane-bis (mercaptopropionic acid)—Molecular weight 224]

| Dibutyl tin oxide | 0.37 | 0.37 | 0.37 |
|---|---|---|---|
| Above compound | 0.19 | 0.25 | 0.34 |
| Resin | 103EP | 103EP | 101EP |
| Dioctyl phthalate | 50 | 0 | 0 |
| Results | Y30 B-75 | Y-0 B-75 | Y-0 B-75 |

Example 14

[Compound: Methane-bis (mercaptoacetic acid)—Molecular weight 196]

| Dibutyl tin oxide | 0.37 |
|---|---|
| Above compound | 0.20 |
| Resin | 103EP |
| Results | Y-15 B-60 |

Example 15

[Compound: Butane-2,2-bis (mercaptoacetic acid)—Molecular weight 248]

| Dibutyl tin oxide | 0.37 | 0.37 |
|---|---|---|
| Above compound | 0.21 | 0.40 |
| Resin | 103EP | 101EP |
| Results | Y-30 B-60 | Y-15 B-60 |

Example 16

[Compound: Cyclohexyl-1,1-bis (mercaptoacetic acid)—Molecular weight 264]

| Dibutyl tin oxide | 0.37 | 0.37 | 0.37 | 0.37 |
|---|---|---|---|---|
| Above compound | 0.235 | 0.40 | 0.22 | 0.40 |
| Resin | 103EP | 101EP | 101EP | 101EP |
| Dioctyl phthalate | 0 | 0 | 0 | 50 |
| Results | Y-30 B-60 | Y-15 B-60 | Y-30 B-60 | Y-30 B-75 |

Example 17

[Compound: 4,4-bis (dodecylthio) valeric acid—Molecular weight 490]

| Dibutyl tin oxide | 0.37 | 0.37 |
|---|---|---|
| Above compound | 0.56 | 0.80 |
| Resin | 103EP | 103EP |
| Results | Y-0 B-60 | Y-0 B-75 |

Example 18

[Compound: Isodecane-1,1-bis (mercaptopropionic acid)—Molecular weight 350]

| | | | |
|---|---|---|---|
| Dibutyl tin oxide | 0.37 | 0.37 | 0.37 |
| Above compound | 0.315 | 0.53 | 0.53 |
| Resin | 103EP | 101EP | 101EP |
| Dioctyl phthalate | 0 | 0 | 50 |
| Results | Y-60 | Y-30 | Y-30 |
| | B-75 | B-75 | B-75 |

Example 19

[Compound: 4-hydroxy-3-methoxybenzaldi (mercaptopropionic acid)—Molecular weight 346]

| | | |
|---|---|---|
| Dibutyl tin oxide | 0.37 | 0.37 |
| Above compound | 0.36 | 0.53 |
| Resin | 103EP | 101EP |
| Results | Y-0 | Y-0 |
| | B-75 | B-75 |

Example 20

[Compound: Propane-2,2-bis (mercaptopropionic acid)—Molecular weight 252]

| | | | | | |
|---|---|---|---|---|---|
| Dibutyl tin oxide | 0 | 0.37 | 0.37 | 0.37 | 0.37 |
| Dioctyl tin oxide | 0.54 | 0 | 0 | 0 | 0 |
| Above compound | 0.41 | 0.38 | 0.20 | 0.48 | 0.22 |
| Resin | 103EP | 101EP | 101EP | 101EP | 103EP |
| Dioctyl phthalate | 0 | 0 | 0 | 0 | 50 |
| Results | Y-60 | Y-60 | Y-60 | Y-75 | Y-105 |
| | B-75 | B-90 | B-90 | B-105 | B-120 |

Example 21

[Compound: 4,4-bis (phenylthio) valeric acid—Molecular weight 318]

| | | |
|---|---|---|
| Dibutyl tin oxide | 0.37 | 0.37 |
| Above Compound | 0.48 | 0.25 |
| Resin | 101EP | 101EP |
| Results | Y-0 | Y-0 |
| | B-60 | B-60 |

Example 22

[Compound: 4,4-bis (carbobutoxy-ethylthio) valeric acid—Molecular weight 422]

| | | | |
|---|---|---|---|
| Dibutyl tin oxide | 0.37 | 0.37 | 0.37 |
| Above compound | 0.66 | 0.33 | 0.66 |
| Resin | 101EP | 101EP | 103EP |
| Dioctyl phthalate | 0 | 0 | 50 |
| Results | Y-60 | Y-30 | Y-60 |
| | B-90 | B-75 | B-90 |

Example 23

[Compound: 4,4-bis (carboxy-ethylthio) valeric acid—Molecular weight 287]

| | | | | |
|---|---|---|---|---|
| Dibutyl tin oxide | 0.37 | 0.37 | 0.37 | 0.37 |
| Above compound | 0.34 | 0.32 | 0.18 | 0.32 |
| Resin | 103EP | 101EP | 101EP | 103EP |
| Dioctyl phthalate | 5 | 0 | 0 | 50 |
| Results | Y-75 | Y-30 | Y-30 | Y-60 |
| | B-105 | B-75 | B-75 | B-90 |

Example 24

[Compound: 2-hydroxybenzaldi (2'-mercaptobenzoic acid)—Molecular weight 392]

| | | | | |
|---|---|---|---|---|
| Dibutyl tin oxide | 0.37 | 0.37 | 0.37 | 0.37 |
| Above compound | 0.42 | 0.37 | 0.70 | 0.70 |
| Reson | 103EP | 101EP | 101EP | 103EP |
| Dioctyl phthalate | 50 | 0 | 0 | 50 |
| Results | Y-30 | Y-0 | Y-0 | Y-15 |
| | B-105 | B-60 | B-60 | B-60 |

Example 25

[Compound: Ethane-1,1,2,2-tetrakis (mercaptopropionic acid)—Molecular weight 456]

| | |
|---|---|
| Dibutyl tin oxide | 0.37 |
| Above compound | 0.25 |
| Resin | 103EP |
| Dioctyl phthalate | 50 |
| Results | Y-15 |
| | B-75 |

Example 26

[Compound: cyclohexyl-1,1-bis (mercaptopropionic acid)—Molecular weight 292]

| | | | |
|---|---|---|---|
| Dibutyl tin oxide | 0.37 | 0.37 | 0.37 |
| Above compound | 0.45 | 0.23 | 0.45 |
| Resin | 101EP | 101EP | 101EP |
| Dioctyl phthalate | 0 | 0 | 50 |
| Results | Y-60 | Y-60 | Y-75 |
| | B-75 | B-75 | B-105 |

Example 27

[Compound: Propane-2,2-bis (mercaptosuccinic acid)—Molecular weight 340]

| | | | |
|---|---|---|---|
| Dibutyl tin oxide | 0.37 | 0.37 | 0.37 |
| Above compound | 0.51 | 0.26 | 0.51 |
| Resin | 101EP | 101EP | 103EP |
| Dioctyl phthalate | 0 | 0 | 50 |
| Results | Y-30 | Y-30 | Y-45 |
| | B-75 | B-75 | B-115 |

Example 28

[Compound: Propane-3,3-bis (mercaptopropionic acid)—Molecular weight 250]

| | | |
|---|---|---|
| Dibutyl tin oxide | 0.37 | 0.37 |
| Above compound | 0.38 | 0.20 |
| Resin | 101EP | 101EP |
| Results | Y-0 | Y-0 |
| | B-75 | B-75 |

Example 29

[Compound: 2-butene-1,1-bis (mercaptopropionic acid)—Molecular weight 264]

| | | |
|---|---|---|
| Dibutyl tin oxide | 0.37 | 0.37 |
| Above compound | 0.40 | 0.22 |
| Resin | 101EP | 101EP |
| Results | Y-0 | Y-0 |
| | B-75 | B-75 |

Example 30

[Compound: Ethyl-3,3-bis (carboxy-ethylthio) butyrate—Molecular weight 324]

| | | | |
|---|---|---|---|
| Dibutyl tin oxide | 0.37 | 0.37 | 0.37 |
| Above compound | 0.49 | 0.26 | 0.49 |
| Resin | 101EP | 101EP | 103EP |
| Dioctyl phthalate | 0 | 0 | 50 |
| Results | Y-15 | Y-30 | Y-75 |
| | B-75 | B-75 | B-90 |

Example 31

[Compound: Pentane-2,2,4,4-tetra (mercaptopropionic acid)—Molecular weight 488]

Formula:

$$\begin{array}{cc} HOOCCH_2CH_2S & SCH_2CH_2COOH \\ \diagdown & \diagup \\ CH_3\overset{|}{C}\!\!-\!\!CH_2\!\!-\!\!\overset{|}{C}CH_3 \\ \diagup & \diagdown \\ HOOCCH_2CH_2S & SCH_2CH_2COOH \end{array}$$

| | | |
|---|---|---|
| Dibutyl tin oxide | 0.37 | 0.37 |
| Above compound | 0.20 | 0.39 |
| Resin | 101EP | 101EP |
| Results | Y-15 | Y-30 |
| | B-75 | B-75 |

Example 32

[Compound: Propane-2,2-bis (mercaptopropionic acid)—Molecular weight 232]

| | | |
|---|---|---|
| Dibutyl tin sulfide | 0.40 | 0.40 |
| Above compound | 0.22 | 0.22 |
| Resin | 101EP | 101EP |
| Dioctyl phthalate | 0 | 50 |
| Results | Y-30 | Y-60 |
| | B-75 | B-105 |

Example 33

[Compound: Benzaldi (mercaptopropionic acid)—Molecular weight 300]

| | | |
|---|---|---|
| Dibutyl tin sulfide | 0.40 | 0.40 |
| Above compound | 0.26 | 0.26 |
| Resin | 101EP | 101EP |
| Dioctyl phthalate | 50 | 0 |
| Results | Y-75 | Y-15 |
| | B-105 | B-75 |

Example 34

[Compound: cyclohexyl-1,1-bis (mercaptopropionic acid)—Molecular weight 264]

| | | |
|---|---|---|
| Dibutyl tin sulfide | 0.40 | 0.40 |
| Above compound | 0.28 | 0.28 |
| Resin | 101EP | 101EP |
| Dioctyl phthalate | 0 | 50 |
| Results | Y-45 | Y-60 |
| | B-75 | B-105 |

The term thioacetal as used herein is in accordance with accepted terminology generic to thioketals.

Example 35

[Compound: Bis (butyl tin) tri (propane-2,2-bis-β-mercaptopropionate)—Mol. wt. 1101.4]

| | | | | | |
|---|---|---|---|---|---|
| Above compound | 0.815 | 0.815 | 0.815 | 0.815 | 0.408 |
| Resin | 103EP | 103EP | 103EP | 101EP | 101EP |
| Dioctyl phthalate | 50 | 50 | 50 | 0 | 0 |
| Results | Y-45 | Y-45 | Y-45 | Y-30 | Y-30 |
| | B-75 | B-90 | B-90 | B-45 | B-45 |

Example 36

[Compound: Bis (butyl tin) tri (benzaldi-bis-β-mercaptopropionate)—Mol wt. 1244.2]

| | | | | | | |
|---|---|---|---|---|---|---|
| Above compound | 0.925 | 0.463 | 0.925 | 0.925 | 0.925 | 0.925 |
| Resin | 101EP | 101EP | 101EP | VYNW | 101EP | 101EP |
| Dioctyl phthalate | 50 | 50 | 50 | 0 | 0 | 0 |
| Epoxidized soybean oil | 0 | 0 | 0 | 0 | 5 | 0 |
| O,O-di tert. butyl p-cresol | 0 | 0 | 0 | 0 | 0 | 0.5 |
| Results | Y-30 | Y-30 | Y-15 | Y-30 | Y-15 | Y-30 |
| | B-60 | B-45 | B-75 | B-45 | B-135 | B-45 |

Example 37

[Compound: Bis (tributyl tin) propane-2,2-bis-β-mercaptopropionate—Mol. wt. 829.4]

| | | |
|---|---|---|
| Above compound | 0.62 | 0.31 |
| Resin | 101EP | 101EP |
| Results | Y-0 | Y-0 |
| | B-60 | B-30 |

Example 38

[Compound: Bis-(tributyl tin) benzaldi-β-mercaptopropionate—Mol. Wt. 1047]

| | | | | | | |
|---|---|---|---|---|---|---|
| Above compound | 0.66 | 0.33 | 0.66 | 0.66 | 0.66 | 0.66 |
| Resin | 101EP | 101EP | 101EP | 101EP | 101EP | VYNW |
| Dioctyl phthalate | 0 | 0 | 50 | 0 | 0 | 0 |
| Epoxidized soybean oil | 0 | 0 | 0 | 5 | 0 | 0 |
| O,O-di tert. butyl p-cresol | 0 | 0 | 0 | 0 | 0.5 | 0 |
| Results | Y-0 | Y-0 | Y-15 | Y-0 | Y-15 | Y-15 |
| | B-75 | B-30 | B-75 | B-75 | B-60 | B-30 |

Example 39

[Compound: Cyclohexyl-1,1-bis (mercaptoacetic acid)]

| | | |
|---|---|---|
| Above compound | 0.59 | 0.59 |
| Butyl stannoic acid | 0.31 | 0 |
| Tributyl tin oxide | 0 | 0.46 |
| Resin | 101EP | 101EP |
| Dioctyl phthalate | 50 | 50 |
| Results | Y-30 | Y-15 |
| | B-60 | B-60 |

Example 40

[Compound: Methane-bis-(mercaptoacetic acid)]

| | | |
|---|---|---|
| Above compound | 0.44 | 0.44 |
| Butyl stannoic acid | 0.31 | 0 |
| Tributyl tin oxide | 0 | 0.46 |
| Resin | 101EP | 101EP |
| Dioctyl phthalate | 50 | 50 |
| Results | Y-30 | Y-15 |
| | B-75 | B-60 |

Example 41

[Compound: Isodecane-1,1-bis-(mercaptoacetic acid)]

| | | |
|---|---|---|
| Above compound | 0.72 | 0.72 |
| Butyl stannoic acid | 0.31 | 0 |
| Tributyl tin oxide | 0 | 0.46 |
| Resin | 101EP | 101EP |
| Results | Y-0 | Y-0 |
| | B-45 | B-30 |

Example 42

[Compound: 4,4-bis-(carboxyethylthio) valeric acid]

| | | |
|---|---|---|
| Above compound | 0.64 | 0.64 |
| Butyl stannoic acid | 0.31 | 0 |
| Tributyl tin oxide | 0 | 0.46 |
| Resin | 101EP | 101EP |
| Results | Y-30 | Y-0 |
| | B-45 | B-60 |

Example 43

[Compound: 4,4-bis-(dodecylthio) valeric acid]

| | | |
|---|---|---|
| Above compound | 1.1 | 1.1 |
| Butyl stannoic acid | 0.31 | 0 |
| Tributyl tin oxide | 0 | 0.46 |
| Resin | 101EP | 101EP |
| Results | Y-15 | Y-0 |
| | B-45 | B-45 |

Example 44

[Compound: 2-butene-1,1-bis-(mercaptopropionic acid)]

| | | |
|---|---|---|
| Above compound | 0.58 | 0.58 |
| Butyl stannoic acid | 0.31 | 0 |
| Tributyl tin oxide | 0 | 0.46 |
| Resin | 101EP | 101EP |
| Dioctyl phthalate | 50 | 50 |
| Results | Y-0 | Y-0 |
| | B-60 | B-30 |

Example 45

[Compound: Ethane-1,1,2,2-tetrakis-(mercaptopropionic acid)]

| | | |
|---|---|---|
| Above compound | 1.0 | 1.0 |
| Butyl stannoic acid | 0.31 | 0 |
| Tributyl tin oxide | 0 | 0.46 |
| Resin | 101EP | 101EP |
| Dioctyl phthalate | 50 | 50 |
| Results | Y-15 | Y-0 |
| | B-60 | B-45 |

Example 46

[Compound: 2-hydroxybenzaldi (2'-mercaptobenzoid acid)]

| | | |
|---|---|---|
| Above compound | 0.87 | 0.87 |
| Butyl stannoic acid | 0.31 | 0 |
| Tributyl tin oxide | 0 | 0.46 |
| Resin | 101EP | 101EP |
| Results | Y-30 | Y-0 |
| | B-75 | B-60 |

Example 47

[Compound: Methane-bis-(mercaptopropionic acid)]

| | | |
|---|---|---|
| Above compound | 0.56 | 0.56 |
| Butyl stannoic acid | 0.31 | 0 |
| Tributyl tin oxide | 0 | 0.46 |
| Resin | 101EP | 101EP |
| Dioctyl phthalate | 50 | 0 |
| Results | Y-30 | Y-0 |
| | B-60 | B-75 |

Example 48

[Compound: Benzaldi (mercaptopropionic acid)]

| | | |
|---|---|---|
| Above compound | 0.67 | 0.67 |
| Butyl stannoic acid | 0.31 | 0 |
| Tributyl tin oxide | 0 | 0.46 |
| Resin | 101EP | 101EP |
| Results | Y-30 | Y-0 |
| | B-60 | B-75 |

The tin containing mercaptoacetal (including mercaptoketal) compounds of the present invention are not only useful for stabilizing halogen containing resins but are also useful in stabilizing polymers of monoolefins having 2 to 4 carbon atoms. While the stabilizers of the present invention can be used with polyethylene, polypropylene, ethylene-propylene copolymers (e.g., a 50–50 copolymer), polybutylene and polyisobutylene, they are preferably employed with polymers and copolymers of polypropylene.

The present invention is suitable for the stabilization of the monoolefin polymers regardless of the method employed to prepare the polymer. Thus, there can be stabilized polyethylene, polypropylene, polybutylene and copolymers of ethylene with propylene prepared with Ziegler type polymerization catalysts, e.g., trialkyl aluminum (tributyl aluminum) with titanium tetrachloride or dibutyl beryllium with titanium tetrachloride. The polymers can be prepared using any of the Ziegler type of catalysts as set forth in Salyer Patent 2,985,617, issued May 23, 1961, for example. However, the stabilizers of the present invention can be employed with polymers of monoolefins prepared by other processes, e.g., polyethylene prepared under high pressure as set forth in Fawcett Patent 2,153,553, for example, or polyethylene, polypropylene or copolymers prepared using Phillips Petroleum or Standard Oil of Indiana type catalysts.

The tin containing mercaptoacetals of the present invention can be used as stabilizers in an amount of 0.01 to 10% by weight of the monoolefin polymer. Preferably, 0.1 to 5% of the stabilizer is employed. When the organotin mercaptoacetals are employed together with other stabilizers, usually 0.01 to 10%, and preferably 0.1 to 5%, of total stabilizer based on the weight of the polymer is employed.

While the organotin mercaptoacetals can be employed alone, synergistic action has been observed when they are employed together with certain other stabilizers. Particularly good results are obtained when there is employed in addition to the organotin compound a neutral sulfur compound having a thio linkage beta to a carbon atom having both a hydrogen atom and a carboxyl group attached thereto. Such compounds are used in an amount of 0.01 to 10% by weight, preferably 0.1 to 5%. The preferred thio compound is dilauryl thiodipropionate. Other thio compounds include distearyl-3,3'-thiodipropionate (dioctadecyl-thiodipropionate),
dicyclohexyl-3,3'-thiodipropionate,
dicetyl-3,3'-thiodipropionate,
dihexyl-3,3'-thiodipropionate,
dioctyl-3,3'-thiodipropionate,
dibenzyl-3,3'-thiodipropionate,
lauryl myristyl-3,3'-thiodipropionate,
diphenyl-3,3'-thiodipropionate,
di-p-methoxyphenyl-3,3'-thiodipropionate,
didecyl-3,3'-thiodipropionate,
dibenzyl-3,3'-thiodipropionate,
diethyl-3,3'-thiodipropionate,
lauryl ester of 3-methylmercapto propionic acid,
lauryl ester of 3-butylmercapto propionic acid,
lauryl ester of 3-laurylmercaptopropionic acid,
phenyl ester of 3-octylmercapto propionic acid,
lauryl ester of 3-laurylmercapto propionic acid,
lauryl ester of 3-phenylmercapto propionic acid,
lauryl ester of 3-benzylmercapto propionic acid,
lauryl ester of 3- (p-methoxy) phenylmercapto propionic acid,
lauryl ester of 3-cyclohexylmercapto propionic acid,
lauryl ester of 3-hydroxymethylmercapto propionic acid,
myristyl ester of 3-hydroxyethylmercapto propionic acid,
octyl ester of 3-methoxymethylmercapto propionic acid,
dilauryl ester of 3-carboxymethylmercapto propionic acid,
dilauryl ester of 3-carboxypropylmercapto propionic acid,
dilauryl-4,7-dithiasebactate,
dilauryl-4,7,8,11-tetrathiatetradecandioate,
dimyristyl-4,11-dithiatetradecandioate,
lauryl-3-benzothiazylmercaptopropionate, as well as other alkyl, cycloalkyl and aryl esters of the beta thiocarboxylic acids set forth in Gribbins patent 2,519,755. Preferably, the esterifying alcohol has 10 to 18 carbon atoms.

Other beta thiocarboxylic acids include stearyl (1,2-dicarboethoxyethylthio) acetate, stearyl (1,2-dicarbolauryloxyethylthio) acetate, lauryl (1,2-dicarboethoxyethylthio) acetate or the like. Compounds of this type can be made in known fashion by addition of an alkyl ester of mercaptoacetic acid to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl, or aralkyl. Examples of such compounds are decylthiodilaurylmaleate, phenylthiodioctyl maleate, cetyl (1,2-dicarboethoxyethylthio) propionate and benzylthiodimyristyl maleate.

Similarly, useful beta thiocarboxyl compounds can be prepared by addition of the RSH compounds as defined above across the double bond of dialkyl itaconates, dialkyl citraconates, dialkyl fumarates, or trialkyl aconitates, e.g., the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the addition product of the lauryl ester of mercapto propionic acid with triethyl aconitate.

The thermal stability of the polypropylene and other polymers of a monoolefin is adversely affected by impurities including residual catalyst. When thermal stability is important in addition to oxidative stability, it has been found valuable to include alkaline earth metal salts of fatty acids in an amount of 0.01 to 10% by weight, preferably 0.1 to 5%, in the tin salt of a carboxy mercaptal formulations. Examples of such salts are calcium stearate, calcium 2-ethylhexoate, calcium octoate, calcium oleate, calcium ricinoleate, calcium myristate, calciuc palmitate, calcium laurate, barium laurate, barium stearate and magnesium stearate. Other fatty acid salts such as cadmium 2-ethylhexoate, zinc stearate, and cadmium stearate can also be employed.

Particularly effective synergistic stabilizing compositions have been obtained by utilizing a mixture of (1) the organotin compound, (2) the thio compound, particularly dilauryl thiodipropionate, and (3) the alkaline earth metal salt of a fatty acid.

The addition of phenolic antioxidants in an amount of 0.01 to 10% by weight, preferably 0.1 to 5%, also has proved effective. Examples of such phenols include 2,6-di-t-butyl-p-cresol, butylated hydroxyanisole, propyl gallate, 4,4'-thiobis (6-tertiary-butyl-m-cresol), 4,4'- cyclohexylidene diphenol, 2,5-di-tertiary-amyl hydroquinone, 4,4'-butylidene bis (6-tertiary-butyl-m-cresol), hydroquinone monobenzyl ether, 2,2' - methylene - bis (4-methyl-6-t-butylphenol), as well as the other phenols set forth in Salyer Patent 2,985,617. Other suitable phenols include 2-tertiary-butyl-4-decyloxyphenol, 2-tertiary-butyl-4-dodecyloxyphenol, 2 - tertiary - butyl - 4-octadecyloxyphenol, 4,4'-methylene - bis - (2,6 - ditertiary butyl phenol), p-aminophenol, N-lauryl-p-aminophenol, 4,4' - thiobis (3 - methyl - 6 - t - butyl - phenol), bis [o-(1,1,3,3-tetramethylbutyl) phenol] sulfide, 4-acetyl-β-resorcyclic acid, A-stage p-tertiary butylphenol-formaldehyde resin, 4-dodecyloxy-2-hydroxy-benzophenone, 3-hydroxy-4-(phenylcarbonyl) phenyl palmitate, n-dodecyl ester of 3-hydroxy-4-(phenylcarbonyl) phenoxyacetic acid and t-butylphenol.

The use of epoxy compounds in an amount of 0.01 to 10% by weight, preferably 0.1 to 5%, in the organotin compound formulations has also been found valuable. Examples of such epoxy compounds include epoxidized soya oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin bisphenol A resins, phenoxy-propylene oxide, butoxy-propylene oxide, epoxidized neopentylene oleate, glycidyl epoxystearate, epoxidized α-olefins, epoxidized glycidyl soyate, dicyclopentadiene dioxide, epoxidized butyl tallate, styrene oxide, dipentene dioxide, glycidol, vinyl cyclohexene dioxide, glycidyl ether of resorcinol, glycidyl ether of hydroquinone, glycidyl ether of 1,5-dihydroxy naphthalene, epoxidized linseed oil fatty acids, allyl glycidyl ether, butyl glycidyl ether, cyclohexane oxide, 4-(2,3-epoxypropoxy) acetyl phenone, mesityl oxide epoxide, 2-ethyl-3-propyl glycidamide, glycidyl ethers of glycerine, pentaerythritol and sorbitol, and 3,4-epoxycyclohexane-1,1-dimethanol bis (9,10-epoxystearate).

The percent of stabilizer in the following examples is based on the amount of polymer being 100%.

*Example 49*

0.5% of the indicated organotin mercaptal salt was blended into polypropylene having an initial melt index at 190° C. of 0.8. The formulation was fabricated into a 20 mil thick strip and heated in an oven at 140° C. The unstabilized polypropylene degraded after 4 hours under these conditions.

Stabilizer: Time to Degradation of Polymer (hours)
Dibutyl tin propane-2,2-bis (mercaptoacetate) ____ 72
Dibutyl tin propane-2,2-bis (mercaptopropionate) _ 48
Dineopentyl tin propane-2,2-bis mercaptopropionate) _____ 24
Dioctyl tin propane-2,2-bis (mercaptopropionate) _ 24
Dibutyl tin butane-2,2-bis (mercaptoacetate) ____ 72
Dibutyl tin butane-2,2-bis (mercaptopropionate) _ 24
Dibutyl tin 2-ethylbutane-1,1-bis (mercapto propionate) _____ 24
Dibutyl tin isodecane-1,1-bis (mercaptopropionate) _____ 72
Dibutyl tin benzaldi (mercaptoacetate) _____ 72
Dibutyl tin benzaldi (mercaptopropionate) _____ 24
Dioctyl tin benzaldi (mercaptopropionate) _____ 48
Dibutyl tin o-hydroxybenzaldi (mercaptoacetate) _ 72
Dibutyl tin o-hydroxybenzaldi (mercaptopropionate) _____ 48
Dioctyl tin o-hydroxybenzaldi (mercaptopropionate) _____ 48
bis (Tributyl tin) propane-2,2-bis (mercaptopropionate) _____ 24
bis (Tributyl tin) benzaldi (mercaptopropionate) _ 48
bis (Butyl tin) tris [propane-2,2-bis (mercaptopropionate)] _____ 24
bis (Butyl tin) tris [benzaldi (mercaptopropionate)] _____ 24
Dioctyl tin o-hydroxybenzaldi (mercaptoacetate) _ 48
Dioctyl tin isodecane-1,1-bis (mercaptoacetate) ___ 48
Dioctyl tin isodecane-1,1-bis (mercaptopropionate) _____ 72
Dibutyl tin isodecane-1,1-bis (mercaptoacetate) __ 48
Dibutyl tin 1-carboethoxypropane-2,2-bis (mercaptopropionate) _____ 24

*Example 50*

A formulation consisting of 0.166% of the indicated organotin mercaptal salt, 0.166% of dilauryl thiodipropionate and 0.166% calcium stearate was blended into the same polypropylene as employed in Example 49 and the strips obtained heated to 140° C. The time to degrade the polymer using the indicated tin compound in this formulation was as follows:

Organotin compound (with dilauryl-
thiodipropionate and calcium stearate): Time (hours)
Dibutyl tin propane-2,2-bis (mercaptoacetate) _ 72
Dibutyl tin propane-2,2-bis (mercaptopropionate) _____ 72
Dineopentyl tin propane-2,2-bis (mercaptopropionate) _____ 120
Dibutyl tin butane-2,2-bis (mercaptoacetate) __ 96
Dibutyl tin isodecane-1,1-bis (mercaptopropionate) _____ 96
Dibutyl tin benzaldi (mercaptoacetate) _____ 120
Dibutyl tin benzaldi (mercaptopropionate) ___ 24
Dioctyl tin benzaldi (mercaptopropionate) ___ 72
Dibutyl tin o-hydroxybenzaldi (mercaptoacetate) _____ 120
Dibutyl tin o-hydroxybenzaldi (mercaptopropionate) _____ 240
bis (Tributyl tin) propane-2,2-bis (mercaptopropionate) _____ 144
bis (Tributyl tin) benzaldi (mercaptopropionate) _____ 96
bis (Butyl tin) tris [propane-2,2-bis (mercaptopropionate)] _____ 96
bis (Butyl tin) tris [benzaldi (mercaptopropionate)] _____ 48
Dioctyl tin o-hydroxybenzaldi (mercaptoacetate) _____ 168
Dioctyl tin o-hydroxybenzaldi (mercaptopropionate) _____ 96
Dioctyl tin isodecane-1,1-bis (mercaptoacetate) _ 216
Dioctyl tin isodecane-1,1-bis (mercaptopropionate) _____ 144
Dibutyl tin isodecane-1,1-bis (mercaptoacetate) _____ 48
Dibutyl tin 1-carboethoxypropane-2,2-bis (mercaptopropionate) _____ 24

Example 51

A formulation consisting of 0.1% of the indicated organotin mercaptal salt, 0.1% dilauryl thiodipropionate, 0.1% 2,6-di tertiary butyl p-cresol and 0.1% stearyl mercaptoacetate was blended into the same polypropylene as employed in Example 49, and the strips obtained heated to 140° C. The time to degrade the polymer using the indicated tin compound in this formulation was as follows:

| Tin compound (with the thiodipropionate, tertiary butyl cresol and mercaptoacetate): | Time (hours) |
|---|---|
| Dibutyl tin benzaldi (mercaptoacetate) | 168 |
| Dibutyl tin benzaldi (mercaptopropionate) | 192 |
| Dibutyl tin o-hydroxybenzaldi (mercaptoacetate) | 192 |
| Dibutyl tin o-hydroxybenzaldi (mercaptopropionate) | 192 |
| Dibutyl tin butane-2,2-bis (mercaptoacetate) | 192 |
| Dibutyl tin butane-2,2-bis (mercaptopropionate) | 168 |
| Dibutyl tin propane-2,2-bis (mercaptoacetate) | 264 |
| Dibutyl tin propane-2,2-bis (mercaptopropionate) | 192 |
| Dibutyl tin isodecane-1,1-bis (mercaptoacetate) | 168 |
| Dibutyl tin isodecane-1,1-bis (mercaptopropionate) | 192 |
| Dibutyl tin cyclohexane-1,1-bis (mercaptoacetate) | 264 |
| Dibutyl tin cyclohexane-1,1-bis (mercaptopropionate) | 168 |
| Dibutyl tin methylene-bis (mercaptoacetate) | 240 |
| Dibutyl tin methylene-bis (mercaptopropionate) | 240 |
| Dibutyl tin 2-ethylbutane-1,1-bis (mercaptopropionate) | 168 |
| Dineopentyl tin propane-2,2-bis (mercaptopropionate) | 192 |
| Dioctyl tin benzaldi (mercaptopropionate) | 168 |
| Dioctyl tin o-hydroxybenzaldi (mercaptoacetate) | 168 |
| Dioctyl tin o-hydroxybenzaldi (mercaptopropionate) | 120 |
| Dioctyl tin isodecane-1,1-bis (mercaptoacetate) | 168 |
| Dioctyl tin isodecane-1,1-bis (mercaptopropionate) | 144 |
| Dioctyl tin propane-2,2-bis (mercaptopropionate) | 168 |
| bis (Tributyl tin) propane-2,2-bis (mercaptopropionate) | 216 |
| bis (Tributyl tin) benzaldi (mercaptopropionate) | 312 |
| Dibutyl tin 1-carboethoxypropane-2,2-bis (mercaptopropionate) | 72 |

We claim:

1. A composition of matter comprising (a) a member of the group consisting of (1) a polymer of a monoolefin having 2 to 4 carbon atoms and (2) a halogen containing resin selected from the group consisting of vinyl and vinylidene resins in which the halogen is attached directly to a carbon atom in the polymer chain and (b) a stabilizing effective amount of a member of the group consisting of (1) a hydrocarbon tin salt of a carboxy mercaptal, said salt having 1 to 3 hydrocarbon groups attached directly to the tin, said carboxy mercaptal being connected to the tin atom through a carboxyl oxygen atom, and (2) a mixture of a member of the group consisting of dihydrocarbon tin oxides, dihydrocarbon tin sulfides, trihydrocarbon tin oxides, monohydrocarbon stannoic acids and monohydrocarbon tin alcoholates with a mercaptal containing a free carboxyl group.

2. A composition of matter comprising (a) a vinyl resin in which the halogen is attached directly to a carbon atom in the polymer chain and (b) a stabilizing effective amount of a member of the group consisting of (1) a hydrocarbon tin salt of a carboxy mercaptal, said salt having 1 to 3 hydrocarbon groups attached directly to the tin, said carboxy mercaptal being connected to the tin atom through a carboxyl oxygen atom, and (2) a mixture of a member of the group consisting of dihydrocarbon tin oxides, dihydrocarbon tin sulfides, trihydrocarbon tin oxides, monohydrocarbon stannoic acids and monohydrocarbon tin alcoholates with a mercaptal containing a free carboxyl group.

3. A composition according to claim 2 wherein the resin is a vinyl chloride resin.

4. A composition of matter comprising a vinyl chloride resin and a stabilizing effective amount of a hydrocarbon tin salt of a carboxy mercaptal, said salt having 1 to 3 hydrocarbon groups attached directly to the tin, said carboxy mercaptal being connected to the tin atom through a carboxyl oxygen atom.

5. A composition of matter comprising a vinyl chloride resin and a stabilizing effective amount of a hydrocarbon tin salt of a hydrocarbon bis (mercaptoalkanoic acid) having 2 to 9 carbon atoms in the alkanoic acid group.

6. A composition of matter comprising a vinyl chloride resin and a stabilizing effective amount of a hydrocarbon tin salt of a hydroxyaryl bis (mercaptoalkanoic acid) having 2 to 9 carbon atoms in the alkanoic acid group.

7. A composition of matter comprising a vinyl chloride resin and a stabilizing effective amount of a mixture of (1) a hydrocarbon tin oxide and (2) a hydrocarbon bis (mercaptoalkanoic acid) having 2 to 9 carbon atoms in the alkanoic acid group.

8. A composition of matter comprising a vinyl chloride resin and a stabilizing effective amount of a mixture of (1) a monohydrocarbon stannoic acid and (2) a hydrocarbon bis (mercaptoalkanoic acid) having 2 to 9 carbon atoms in the alkanoic acid group.

9. A composition of matter comprising a vinyl chloride resin and a stabilizing effective amount of a mixture of (1) a hydrocarbon tin oxide and a monohydrocarbon stannoic acid and (2) a hydroxyaryl bis (mercaptoalkanoic acid) having 2 to 9 carbon atoms in the alkanoic acid group.

10. A composition of matter comprising (a) a polymer of a monoolefin having 2 to 4 carbon atoms and (b) a stabilizing effective amount of a member of the group consisting of (1) a hydrocarbon tin salt of a carboxy mercaptal, said salt having 1 to 3 hydrocarbon groups attached directly to the tin, said carboxy mercaptal being connected to the tin atom through a carboxyl oxygen atom, and (2) a mixture of a member of the group consisting of dihydrocarbon tin oxides, dihydrocarbon tin sulfides, trihydrocarbon tin oxides, monohydrocarbon stannoic acids and monohydrocarbon tin alcoholates with a mercaptal containing a free carboxyl group.

11. A stabilized composition according to claim 10 including a neutral sulfur compound having a thio linkage beta to a carbon atom having both a hydrogen atom and a carboxyl group attached thereto.

12. A stabilized composition according to claim 11 wherein the polymer is polypropylene and the composition also includes a phenolic antioxidant.

13. A stabilized composition according to claim 10 wherein the polymer is polypropylene.

14. A stabilized composition according to claim 13 including a neutral sulfur compound having a thio linkage beta to a carbon atom having both a hydrogen atom and a carboxyl group attached thereto.

15. A stabilized composition according to claim 14 wherein the sulfur compound is dilauryl thiodipropionate.

16. A composition of matter comprising a solid polypropylene and a stabilizing effective amount of a hydrocarbon tin salt of a carboxy mercaptal, said salt having 1 to 3 hydrocarbon groups attached directly to the tin, said carboxy mercaptal being connected to the tin atom through a carboxyl oxygen atom.

17. A composition of matter comprising a solid polypropylene and a stabilizing effective amount of a hydrocarbon tin salt of a hydrocarbon bis (mercaptoalkanoic acid) having 2 to 9 carbon atoms in the alkanoic acid group.

18. A composition of matter comprising a solid polypropylene and a stabilizing effective amount of a hydrocarbon tin salt of a hydroxyaryl bis (mercaptoalkanoic acid) having 2 to 9 carbon atoms in the alkanoic acid group.

References Cited by the Examiner
UNITED STATES PATENTS

| | | | |
|---|---|---|---|
| 2,892,856 | 6/51 | Ramsden et al. | 260—429.7 |
| 2,938,013 | 5/60 | Mack et al. | 260—45.75 |
| 2,965,661 | 12/60 | Ramsden | 260—429.7 |
| 2,972,595 | 2/61 | Bavely et al. | 260—25.75 |

LEON J. BERCOVITZ, *Primary Examiner.*

TOBIAS E. LEVOW, *Examiner.*